April 9, 1946. G. E. DATH 2,398,083
COMBINED SPRING AND FRICTION SHOCK ABSORBING MECHANISM
Filed Aug. 25, 1944
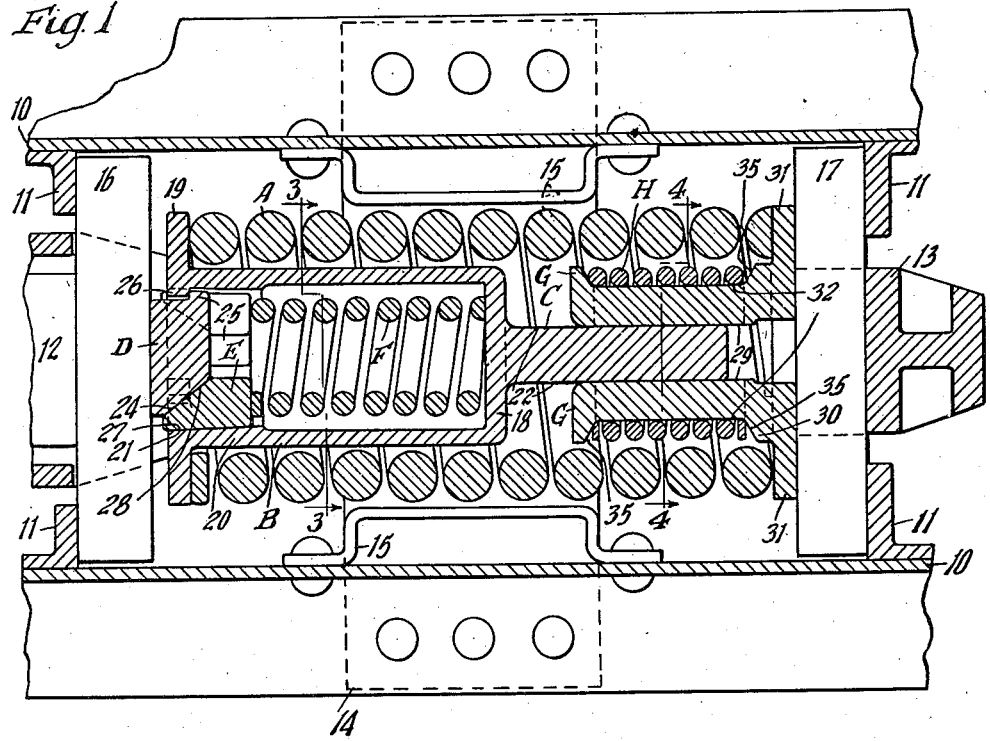
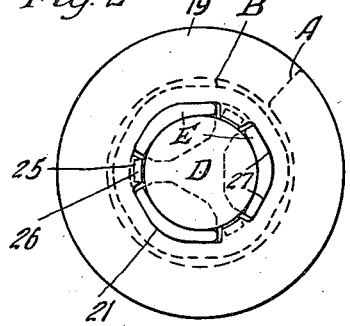
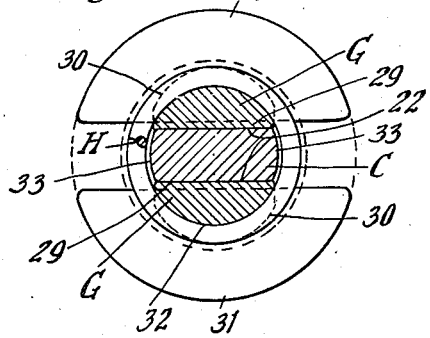
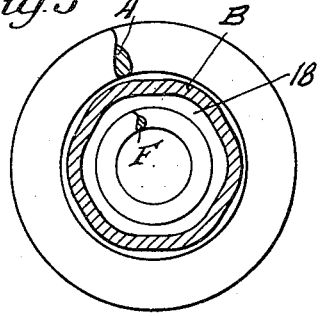
Inventor
George E. Dath
By Henry Fuchs
Atty.

Patented Apr. 9, 1946

2,398,083

UNITED STATES PATENT OFFICE 2,398,083

COMBINED SPRING AND FRICTION SHOCK ABSORBING MECHANISM

George E. Dath, Mokena, Ill., assignor to W. H. Miner, Inc., Chicago, Ill., a corporation of Delaware Application August 25, 1944, Serial No. 551,206

7 Claims. (Cl. 213—24)

This invention relates to improvements in combined spring and friction shock absorbing mechanisms particularly adapted for use in connection with railway draft riggings.

One object of the invention is to provide a combined spring and friction shock absorbing mechanism having mainly spring action followed by combined spring and frictional resistance during the latter part of the compression stroke, wherein snubbing means is provided for dampening the spring action to reduce oscillations to a minimum.

A more specific object of the invention is to provide a mechanism as set forth in the preceding paragraph comprising a main spring resistance; a friction casing, movement of which is resisted by the main spring resistance; a friction clutch receiving the actuating force and having sliding frictional engagement with the interior walls of the casing; a spring resisting inward movement of the clutch with respect to the casing; and means for snubbing the action of the main spring resistance, including a friction post movable in unison with the friction shell and friction blocks yieldingly pressed against the post to frictionally oppose movement of the post and casing, wherein the friction casing is moved by the gripping action of the clutch to compress the main spring resistance during the major portion of the compression stroke of the mechanism, and has its movement arrested after a predetermined compression of the mechanism to compel relative movement of the clutch and casing during the remainder of the compression stroke to provide high frictional resistance to take care of the heavier shocks to which the mechanism is subjected.

Other objects of the invention will more clearly appear from the description and claims hereinafter following.

In the drawing forming a part of this specification, Figure 1 is a horizontal, longitudinal sectional view through a portion of the underframe structure of a railway car, illustrating my improvements in connection therewith. Figure 2 is a front end elevational view of the combined spring and friction shock absorbing mechanism illustrated in Figure 1. Figures 3 and 4 are transverse, vertical sectional views, corresponding respectively to the lines 3—3 and 4—4 of Figure 1.

In said drawing 10—10 indicate channel-shaped draft sills of a railway car underframe to the inner sides of which are secured the usual front and rear stop lugs 11—11 and 11—11. The inner end of the coupler shank is indicated by 12 and a yoke 13 of well-known form is secured to the shank. A saddle plate 14 secured to the underneath side of the draft sills supports the yoke and the parts therewithin for movement lengthwise of the car. On the inner sides, the draft sills 10—10 are provided with guides 15—15 of well-known form to center the draft gear. The yoke 13 contains the usual front and rear follower members 16 and 17 and my improved combined spring and friction shock absorbing mechanism.

My improved combined spring and friction shock absorbing mechanism comprises broadly a main spring resistance A; a friction casing B; a friction post C integral with the casing; a wedge block D; three friction shoes E—E—E; an inner spring F within the casing B; a pair of friction elements G—G; and a spring H cooperating with the friction elements to press the same against the post C.

The friction casing B is in the form of a cylindrical shell open at the front end and closed at its rear end by a transverse vertical wall 18. At the open front end, the casing B is provided with an outstanding annular flange 19 which functions as a spring follower member. The casing B has the walls, at the front end portion thereof, inwardly thickened, as indicated at 20, said thickened portion of the casing forming the friction shell proper of the mechanism. The friction shell portion of the casing B is provided with three interior, longitudinally extending friction surfaces 21—21—21 of V-shaped, transverse cross section. The friction surfaces 21 converge inwardly of the casing. The friction post C is in the form of a heavy, flat plate of rectangular outline, which is formed integral with the casing B and extends lengthwise of the mechanism, projecting rearwardly from the wall 18 of the casing. On opposite sides, the post C is provided with longitudinally extending, flat friction surfaces 22—22.

The wedge D is in the form of a solid block having a vertical front end face 23, which bears directly on the front follower 16 of the draft rigging. At the inner end, the wedge block D is provided with three inwardly converging flat wedge faces 24—24—24 arranged symmetrically about the central longitudinal axis of the mechanism. The wedge block D is further provided with three radial lugs 25—25—25 at the inner end thereof, which project outwardly and are adapted to engage in back of three circumferentially spaced, inturned lugs 26—26—26 at the front end of the casing B.

The friction shoes E are three in number and surround the wedge block D. Each shoe has a V-shaped outer friction surface 27, which engages with the corresponding V-shaped friction surface 21 of the casing B. On the inner side, each shoe has a flat wedge face 28, which engages the corresponding wedge face 24 of the wedge block D.

The spring resistance F is in the form of a helical coil disposed within the casing B and bears at its front end on the inner ends of the three shoes E—E—E and at its rear end on the transverse end wall 18 of the casing. The spring F is preferably under initial compression, thus pressing the shoes against the wedge block which is held against outward movement of the casing by shouldered engagement with the lugs 26—26—26.

The two friction elements G—G are in the form of elongated, platelike members, each having a flat, longitudinally extending friction surface 29 on the inner side thereof cooperating with the corresponding friction surface 22 of the post C. Each element G is laterally enlarged or thickened, at the front and rear ends, as indicated at 30—30. The thickened portion 30 at the rear end of each element G is provided with a laterally projecting end flange 31, which is of arc-shaped form. The two elements G—G embrace the post C at opposite sides and the two flanges 31—31 of said elements together form, in effect, a two-part circular follower flange corresponding in outside diameter to the annular flange 19 of the casing B. The outer sides of the shoes are transversely curved, thus presenting semi-cylindrical, outer surfaces 32—32 which are of the same radius and concentric. The opposite edge faces of the post are also curved transversely, as indicated at 33—33. The faces 33—33 are concentric but of shorter radius than the surfaces 32—32 of the elements G—G. The surfaces 33—33 of the post are thus slightly inset with respect to the surfaces 32—32 of the elements G—G. Each element G is further provided with wedge faces 35—35 at opposite ends thereof, the wedge faces 35—35 facing inwardly and being formed on the enlargements 30—30. Each wedge face is preferably of conical contour.

The spring resistance H is in the form of a light helical coil which surrounds the elements G—G and has the coils at opposite ends thereof in wedging engagement, respectively, with the wedge faces 35—35. The spring resistance H is under a predetermined constant compression and wedges the elements G—G against the post C.

The main spring resistance A is in the form of a relatively heavy, helical coil, which surrounds the casing B and the friction elements G—G, and bears at its front end on the flange 19 of the casing B and at its rear end on the flanges 31—31 of the friction elements G—G. The post C has its rear end normally spaced from the follower 17 and is adapted to engage said follower to limit inward movement of the casing B to less than the full compression stroke of the mechanism. When the mechanism is fully compressed, the post C in conjunction with the casing B acts as a solid column to transmit the actuating force from the front follower 16 to the rear follower 17 and prevents undue compression of the spring A.

The operation of my improved combined spring and friction shock absorbing mechanism is as follows: When the coupler is pulled forwardly in draft or moved inwardly in buff, the followers 16 and 17 are moved inwardly toward each other, thereby compressing the shock absorbing mechanism. During compression of the mechanism, the wedge block D is forced inwardly, wedging the shoes E—E—E apart and pressing the same tightly against the friction surfaces of the casing B. Due to the frictional resistance produced by this wedging action, the clutch, comprising the wedge and friction shoes, tightly grips the casing and compels the same to move inwardly in unison with the wedge block D. As the casing B is moved inwardly, the main spring resistance A is compressed between the follower flanges of the casing and the friction elements G—G. During this action, the friction post slides inwardly or rearwardly between the friction elements G—G, which are forced against the post by the spring H, thereby effecting a snubbing action of the main spring resistance A. The described action continues until the outer end of the post C engages the rear follower 17, whereupon movement of the post and the casing B is arrested, compelling inward movement of the wedge D with respect to the casing during the remainder of the compression stroke. During inward movement of the wedge D with respect to the casing B, high frictional resistance is created between the friction surfaces of the casing and the shoes E—E—E. Compression of the mechanism is finally limited by engagement of the front follower 16 with the front end of the casing B. During release of the mechanism, the main spring resistance A returns the casing to the normal position shown in Figure 1 and the spring F returns the friction shoes and wedge block to their normal positions, outward movement of the wedge block being limited by engagement of the lugs 25 thereof with the lugs 26 of the casing.

As will be evident, the action of the main spring resistance A is effectively snubbed during both compression and release of the mechanism by the spring pressed friction elements G—G which cooperate with the post C, which is integral with the casing B.

I have herein shown and described what I now consider the preferred manner of carrying out my invention, but the same is merely illustrative and I contemplate all changes and modifications that come within the scope of the claims appended hereto.

I claim:

1. In a combined spring and friction shock absorbing mechanism, the combination with a friction casing open at one end and closed at the other end; of a friction post projecting lengthwise from said closed end of the casing; friction elements embracing said post and with which the post has sliding frictional engagement; a spring surrounding said elements and pressing the same against the post, said casing and elements being lengthwise movable toward and away from each other; a main spring resistance yieldingly opposing relative lengthwise approach of the casing and elements; a friction clutch slidingly telescoped within the open end of the casing; a spring within the casing yieldingly opposing inward movement of the clutch; and means for limiting inward movement of the post and casing to less than the full compression stroke of the mechanism.

2. In a combined spring and friction shock absorbing mechanism, the combination with a friction casing open at one end and closed at the other end; of a laterally outwardly projecting flange at said open end of the casing; a friction post projecting lengthwise from said closed end of the casing; friction elements embracing said post and with which the post has sliding frictional engagement; laterally outwardly projecting follower flanges at the outer ends of said elements; means yieldingly forcing said elements against the post, said casing and elements being lengthwise movable toward and away from each other; a main spring resistance interposed between the flanges of the casing and elements, yieldingly opposing relative lengthwise approach of the casing and elements; a friction clutch slidingly telescoped within the open end of the casing; a spring within the casing yieldingly opposing inward movement of the clutch; and means limiting inward movement of the post and casing to less than the full compression stroke of the mechanism.

3. In a combined spring and friction shock absorbing mechanism, the combination with a main follower; of a second main follower, said followers being movable toward and away from each other; a lengthwise movable friction casing open at one end and closed at the other end; a laterally outwardly projecting flange at said open end of the casing; a friction post fixed to the casing and projecting lengthwise from the closed end of said casing, said post being movable in unison with the casing and having its movement limited to less than the full compression stroke of the mechanism by engagement with said first named follower; friction elements embracing said post and with which the post has sliding frictional engagement; laterally outwardly projecting follower flanges at the outer ends of said elements bearing on said first named follower; means yieldingly forcing said elements against the post, said casing and elements being lengthwise movable toward and away from each other; a main spring resistance interposed between the flanges of the casing and elements, yieldingly opposing relative lengthwise approach of the casing and said elements; a friction clutch slidingly telescoped within the open end of the casing, said clutch including a wedge pressure transmitting block projecting outwardly of the casing and bearing on said second named follower; and a spring within the casing yieldingly opposing inward movement of the clutch.

4. In a combined spring and friction shock absorbing mechanism, the combination with a friction casing; of a friction post projecting lengthwise from the casing; friction elements embracing said post and with which the post has sliding frictional engagement, said casing and elements being lengthwise movable toward and away from each other; a main spring resistance yieldingly opposing relative lengthwise approach of the casing and elements; a friction clutch slidingly telescoped within the casing in frictional contact with the interior walls of the latter; a spring within the casing yieldingly opposing inward movement of the clutch; a spring surrounding said elements and having wedging engagement therewith to force the same against the post; and means for limiting inward movement of the post and casing to less than the full compression stroke of the mechanism.

5. In a combined spring and friction shock absorbing mechanism, the combination with a friction casing open at one end and closed at the other end; of a friction post projecting lengthwise from said closed end of the casing; friction elements embracing said post and with which the post has sliding frictional engagement; fixed wedge faces at opposite ends of said elements; a spring surrounding said elements and having direct wedging engagement with the wedge faces thereof for pressing said elements against the post, said casing and elements being lengthwise movable toward and away from each other; a main spring resistance yieldingly opposing relative lengthwise approach of the casing and elements; a friction clutch slidingly telescoped within the open end of the casing; a spring within the casing yieldingly opposing inward movement of the clutch; and means for limiting inward movement of the post and casing to less than the full compression stroke of the mechanism.

6. In a combined spring and friction shock absorbing mechanism, the combination with a friction casing open at one end and closed at the other end; of a laterally outwardly projecting flange at said open end of the casing; a friction post projecting lengthwise from said closed end of the casing; friction elements embracing said post and with which the post has sliding frictional engagement; laterally outwardly projecting follower flanges at the outer ends of said elements; inwardly facing wedge faces at opposite ends of said elements; a helical spring surrounding said elements and bearing at opposite ends on the wedge faces at opposite ends of said elements for forcing said elements against the post, said casing and elements being lengthwise movable toward and away from each other; a main spring resistance interposed between the flanges of the casing and elements yieldingly opposing relative lengthwise approach of the casing and elements; a friction clutch slidingly telescoped within the open end of the casing; a spring within the casing yieldingly opposing inward movement of the clutch; and means limiting inward movement of the post and casing to less than the full compression stroke of the mechanism.

7. In a combined spring and friction shock absorbing mechanism, the combination with a friction casing open at one end and closed at the other end; of a laterally outwardly projecting flange at said open end of the casing; a friction post projecting lengthwise from said closed end of the casing; friction elements embracing said post and with which the post has sliding frictional engagement; laterally outwardly projecting follower flanges at the outer ends of said elements; a spring under constant compression yieldingly wedging said elements against the post, said casing and elements being lengthwise movable toward and away from each other; a main spring resistance interposed between the flanges of the casing and elements yieldingly opposing relative lengthwise approach of the casing and elements; a friction clutch slidingly telescoped within the open end of the casing; a spring within the casing yieldingly opposing inward movement of the clutch; and means limiting inward movement of the post and casing to less than the full compression stroke of the mechanism.

GEORGE E. DATH.